Patented Apr. 24, 1923.

1,453,021

UNITED STATES PATENT OFFICE.

PAUL ONNERTZ, OF BERLIN-WILMERSDORF, GERMANY, ASSIGNOR TO ACTIEN GESELLSCHAFT FÜR ANILIN FABRIKATION, OF BERLIN, GERMANY.

PREPARATION FOR DYEING FURS, HAIRS, AND THE LIKE.

No Drawing. Application filed April 17, 1922. Serial No. 553,982.

*To all whom it may concern:*

Be it known that I, PAUL ONNERTZ, a citizen of the German Republic, residing at Berlin-Wilmersdorf, Germany, my P. O. address being Dusseldorferstrasse 72, Berlin-Wilmersdorf, Germany, have invented certain new and useful Improvements in Preparations for Dyeing Furs, Hairs, and the like, of which the following is a specification.

The present invention relates to a preparation for dyeing hairs, furs and the like from red-brown to violet to blue to black tints. The new preparation comprises a 4-amino-1-oxyderivative of the benzene series, such as 4-aminophenol, and a m-diaminophenolalkylether. The preparation is used in a preferably weak alkaline aqueous solution in combination with an oxidizing agent.

The following example may serve to illustrate my invention, without limiting it:

In order to prepare the new composition of matter 3 parts by weight of 4-aminophenol hydrochloride are mixed with 5 parts of 2.4-diaminoanisol.

From this preparation a dye-bath may be made by dissolving 2 g. in 1 litre of water and adding 2 g. of ammonium hydroxide (of 25% strength) and 30 g. of hydrogen peroxide (of about 25% strength). The previously well washed and if necessary mordanted fur is introduced into this bath at ordinary temperature and handled during 4 hours. The fur is then well rinsed, dried and finished in the usual manner. Thus on furs non-mordanted or prepared with ferric, cupric or chromic mordants Bordeaux tints are obtained.

Instead of 4-aminophenol its derivatives substituted in the necleus, for instance 2-chloro-4-aminophenol or 2.6-dichloro-4-aminophenol may be employed, the dyeings becoming more bluish. 2.4-diaminoanisol may be replaced by 2.4-diaminophenetol. Instead of the bases their salts may be used.

Having now described my invention and the manner in which it may be performed what I claim is,—

1. As new compositions of matter preparations for dyeing hairs, furs and the like, comprising a 4-amino-1-oxyderivative of the benzene series and a m-diaminophenol-alkylether, in aqueous solution in combination with an oxidizing agent producing on hairs, furs and the like from red-brown to violet to blue to black tints.

2. As new composition of matter a preparation for dyeing hairs, furs and the like, comprising 4-aminophenol and 2.4-diaminoanisol, in aqueous solution in combination with an oxidizing agent, producing on hairs, furs and the like Bordeau tints.

3. As new composition of matter a preparation for dyeing hairs, furs and the like, comprising 4-aminophenol and 2.4-diaminoanisol in connection with an acid, in aqueous solution in combination with an oxidizing agent producing on hairs, furs and the like Bordeaux tints.

In testimony whereof I affix my signature in presence of two witnesses.

PAUL ONNERTZ.

Witnesses:
LEO KERKOVIUS,
MAX FRAUNS.